(12) United States Patent
Grigor et al.

(10) Patent No.: US 8,719,585 B2
(45) Date of Patent: May 6, 2014

(54) SECURE UPDATE OF BOOT IMAGE WITHOUT KNOWLEDGE OF SECURE KEY

(75) Inventors: Gordon Grigor, San Francisco, CA (US); Phillip Norman Smith, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 422 days.

(21) Appl. No.: 12/029,467

(22) Filed: Feb. 11, 2008

(65) Prior Publication Data

US 2010/0070743 A1 Mar. 18, 2010

(51) Int. Cl.
*G06F 11/30* (2006.01)

(52) U.S. Cl.
USPC .......... 713/187; 713/1; 713/2; 713/163; 713/175; 713/193; 713/330; 717/126; 717/170; 717/168

(58) Field of Classification Search
USPC .......................... 713/187; 717/126, 168, 170
See application file for complete search history.

(56) References Cited

U.S. PATENT DOCUMENTS

| | | | |
|---|---|---|---|
| 5,457,748 A | 10/1995 | Bergum et al. | |
| 6,185,678 B1 | 2/2001 | Arbaugh et al. | |
| 2001/0011347 A1* | 8/2001 | Narayanaswamy et al. | 713/2 |
| 2003/0023822 A1 | 1/2003 | Scott et al. | |
| 2003/0056107 A1 | 3/2003 | Cammack et al. | |
| 2003/0084337 A1 | 5/2003 | Simionescu et al. | |
| 2003/0115471 A1* | 6/2003 | Skeba | 713/180 |
| 2003/0177373 A1 | 9/2003 | Moyer et al. | |
| 2006/0136748 A1 | 6/2006 | Bade et al. | |
| 2006/0174109 A1* | 8/2006 | Flynn | 713/164 |
| 2006/0174240 A1* | 8/2006 | Flynn | 717/170 |
| 2006/0179308 A1* | 8/2006 | Morgan et al. | 713/168 |
| 2007/0027988 A1* | 2/2007 | Lavin et al. | 709/225 |
| 2007/0055881 A1* | 3/2007 | Fuchs et al. | 713/175 |
| 2007/0083744 A1* | 4/2007 | Seok | 713/1 |
| 2007/0169098 A1* | 7/2007 | Kikuchi | 717/168 |
| 2007/0198851 A1 | 8/2007 | Goto | |
| 2007/0217614 A1* | 9/2007 | Fujiwara et al. | 380/277 |
| 2007/0220242 A1* | 9/2007 | Suzuki et al. | 713/1 |
| 2007/0234130 A1* | 10/2007 | Sullivan et al. | 714/43 |
| 2007/0300207 A1* | 12/2007 | Booth et al. | 717/126 |
| 2008/0040598 A1* | 2/2008 | Lee et al. | 713/2 |
| 2008/0077973 A1 | 3/2008 | Zimmer et al. | |
| 2008/0082680 A1* | 4/2008 | Grewal et al. | 709/232 |
| 2008/0086630 A1 | 4/2008 | Rogers et al. | |
| 2008/0086652 A1* | 4/2008 | Krieger et al. | 713/330 |
| 2008/0114994 A1* | 5/2008 | Iyer et al. | 713/193 |
| 2008/0137848 A1* | 6/2008 | Kocher et al. | 380/201 |
| 2008/0165952 A1 | 7/2008 | Smith et al. | |

FOREIGN PATENT DOCUMENTS

| | | |
|---|---|---|
| EP | 0961193 | 12/1999 |
| EP | 1845470 | 10/2007 |
| GB | 2427720 | 1/2007 |

(Continued)

OTHER PUBLICATIONS

Yano Koshio, et al. Hardware-Dependent Software-Role of Firmware Study Bootloader from CPU Mechanism/Design of BIOS, Interface, Japan, CQ Publishing Co., Ltd., Jan. 1, 2008, vol. 34, No. 1, p. 95-104.

*Primary Examiner* — Ashok Patel
*Assistant Examiner* — Gary Gracia

(57) ABSTRACT

Techniques for securely updating a boot image without knowledge of a secure key used to encrypt the boot image.

18 Claims, 14 Drawing Sheets

(56) References Cited

FOREIGN PATENT DOCUMENTS

| | | |
|---|---|---|
| JP | 2004530235 A | 9/2004 |
| JP | 2005122733 A | 5/2005 |
| TW | 200306107 | 11/2003 |
| WO | WO02/21763 | 3/2002 |
| WO | 2006086301 A1 | 8/2006 |
| WO | 2008009112 A1 | 1/2008 |
| WO | WO2008/071572 | 6/2008 |

\* cited by examiner

SECURE UPDATE OF BOOT IMAGE WITHOUT KNOWLEDGE OF SECURE KEY

BACKGROUND OF THE INVENTION

Security mechanisms are becoming of ever increasing importance in electronics. The manufacturers of systems and devices used in systems desire to control how systems and devices are used (e.g., stop un-authorized uses) and protect programs (e.g., operating systems and applications) and content from duplication, un-authorized modifications and the like. Accordingly, the manufacturer of devices may need to provide device level security mechanisms and/or system level security mechanisms. The device and/or system security techniques may also need to provide end user security mechanisms to control how systems and devices are used (e.g., stop un-authorized uses) and protect programs (e.g., operating systems and applications) and content from duplication, un-authorized modifications and the like.

The manufacture of electronics may also involve numerous entities. For example, a device manufacturer may design a given device but outsource the actual fabrication of the devices. Similarly, the system manufacturer may design the system but outsource the actual fabrication of the system. Although some parties may trust each other, not all parties may trust all the other entities involved in the design and manufacture of devices and systems. For example, the device and system manufacturer may trust each other, but the device manufacturer may not trust the assembly house used by the system manufacturer or may just not want to or have the capability to monitor the assembly house used by the system manufacturer to ensure that the assembly house can be trusted with access to software, firmware, configuration parameters and/or the like.

Accordingly, there is a continuing need for improved techniques that provide for device and/or system security mechanisms. The security mechanisms should also provide protection at different stages of manufacture from device design to system manufacture.

SUMMARY OF THE INVENTION

Embodiments of the present technology are directed toward techniques for securely updating a boot image without knowledge of the key used to encrypt the boot image. In one embodiment, a new boot loader is received from a service provider and loaded into a given peripheral. A reset is then performed to start execution of a boot code. The first portion of the boot code is stored on the chip and establishes a chain of trust. The boot code calculate a secure boot key, authenticates the new boot loader received from the service provider and then stores the authenticated new boot leader encrypted using the secure boot key in a peripheral device specified for executing the boot loader from.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Figure 1:
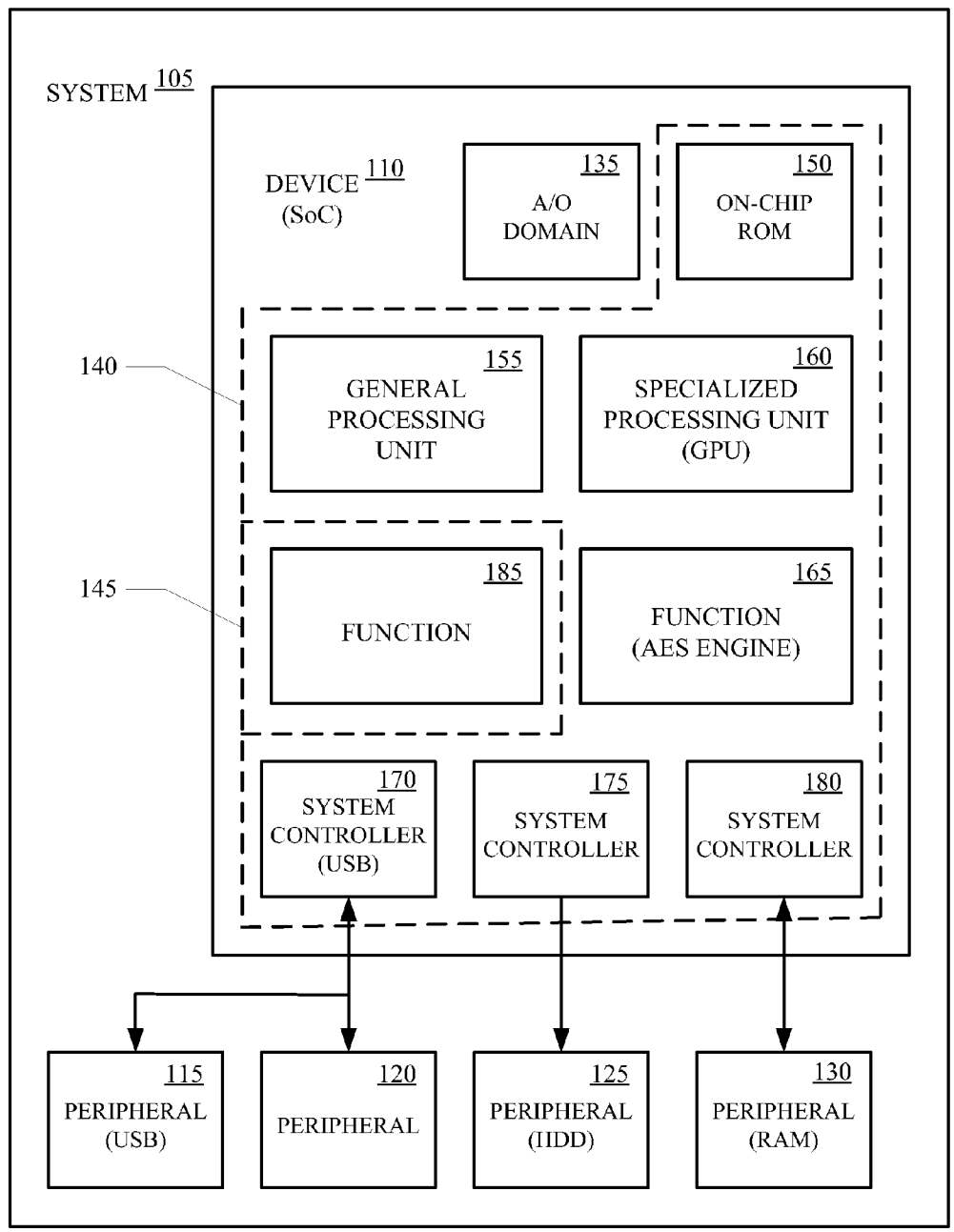
FIG. 1 shows a block diagram of an exemplary system for implementing embodiments of the present technology.
Figure 2A:
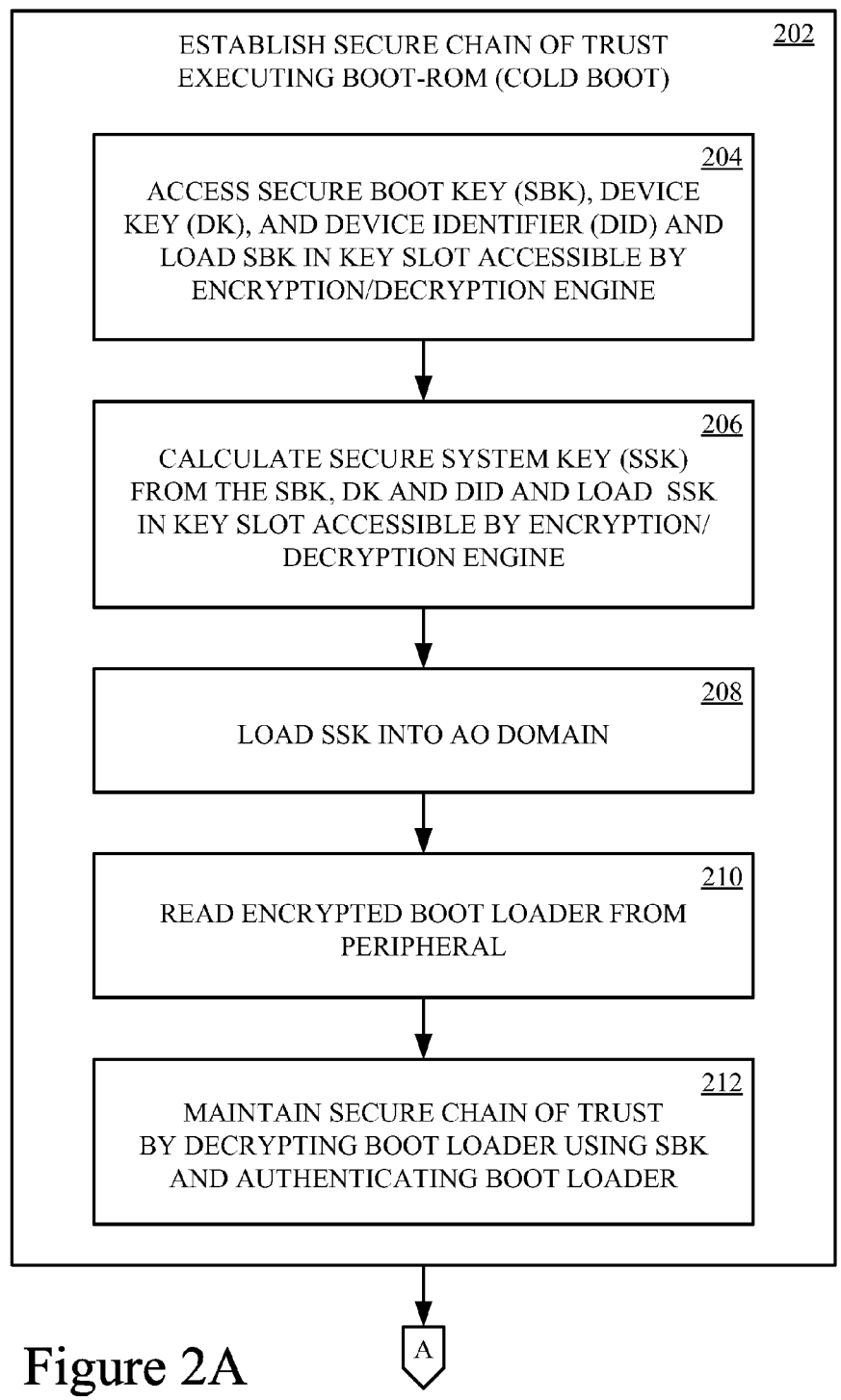
FIGS. 2A-2D show a flow diagram of a method of handling storage keys during a plurality of power states of the device, in accordance with one embodiment of the present technology.
Figure 2A:
Figure 2B:
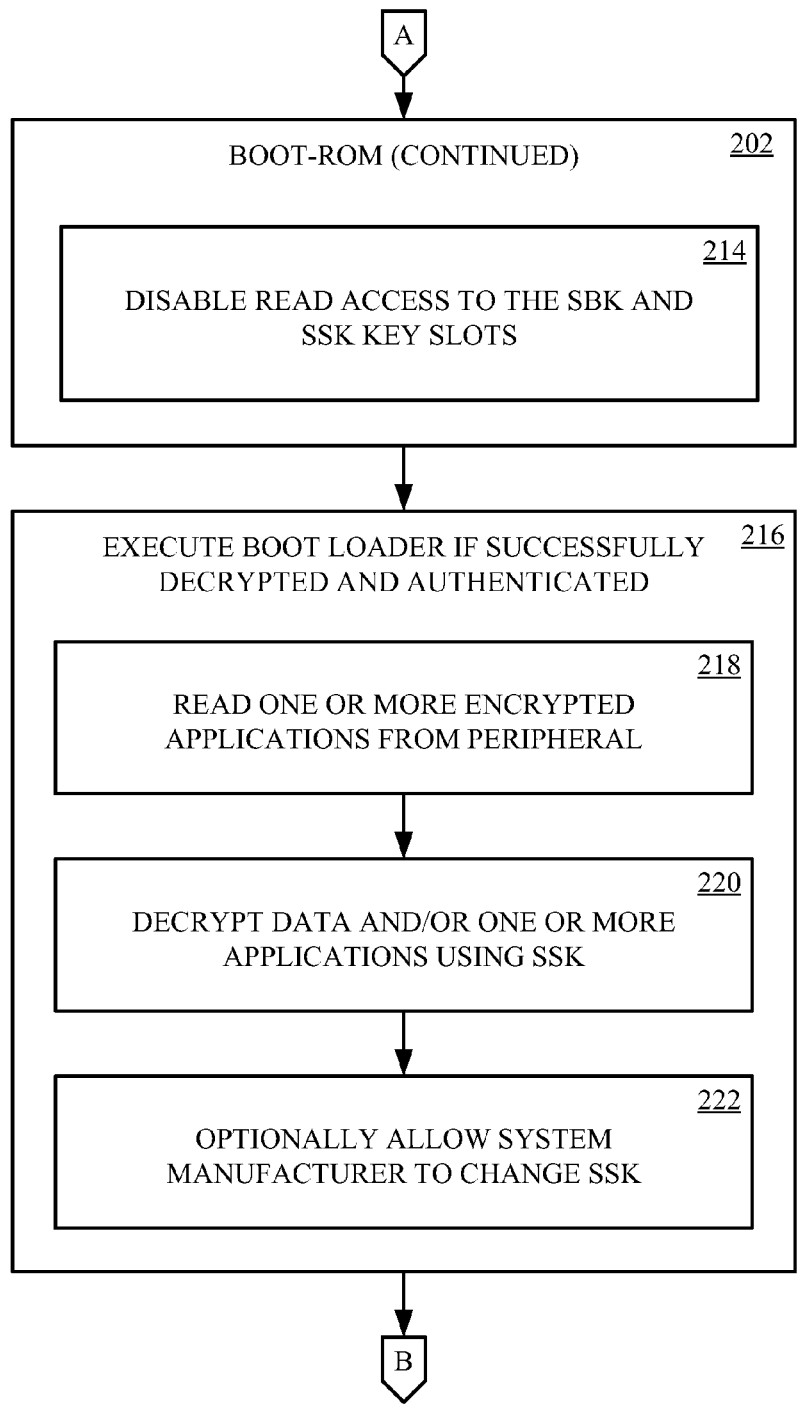
Figure 2C:
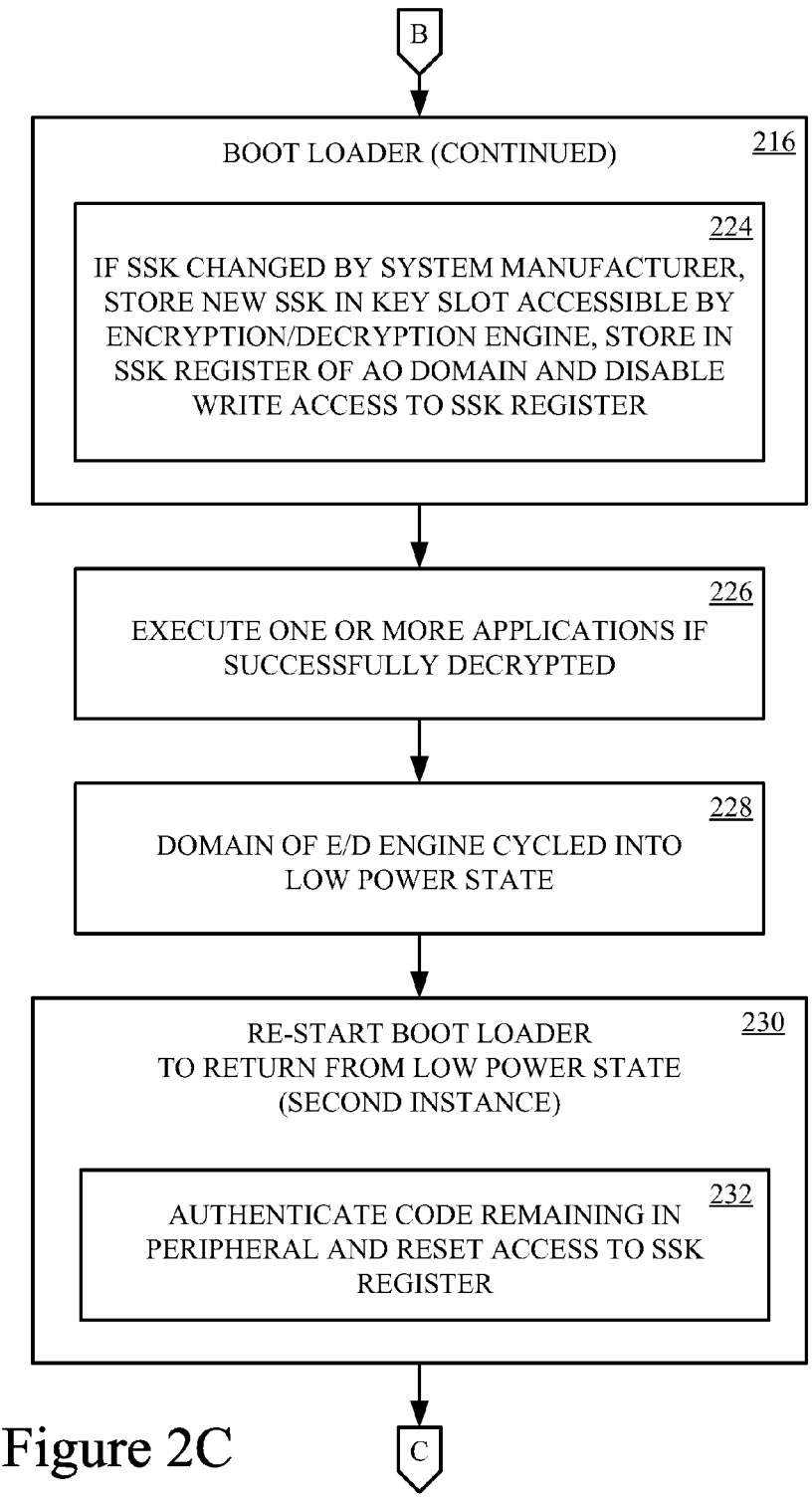
Figure 2D:
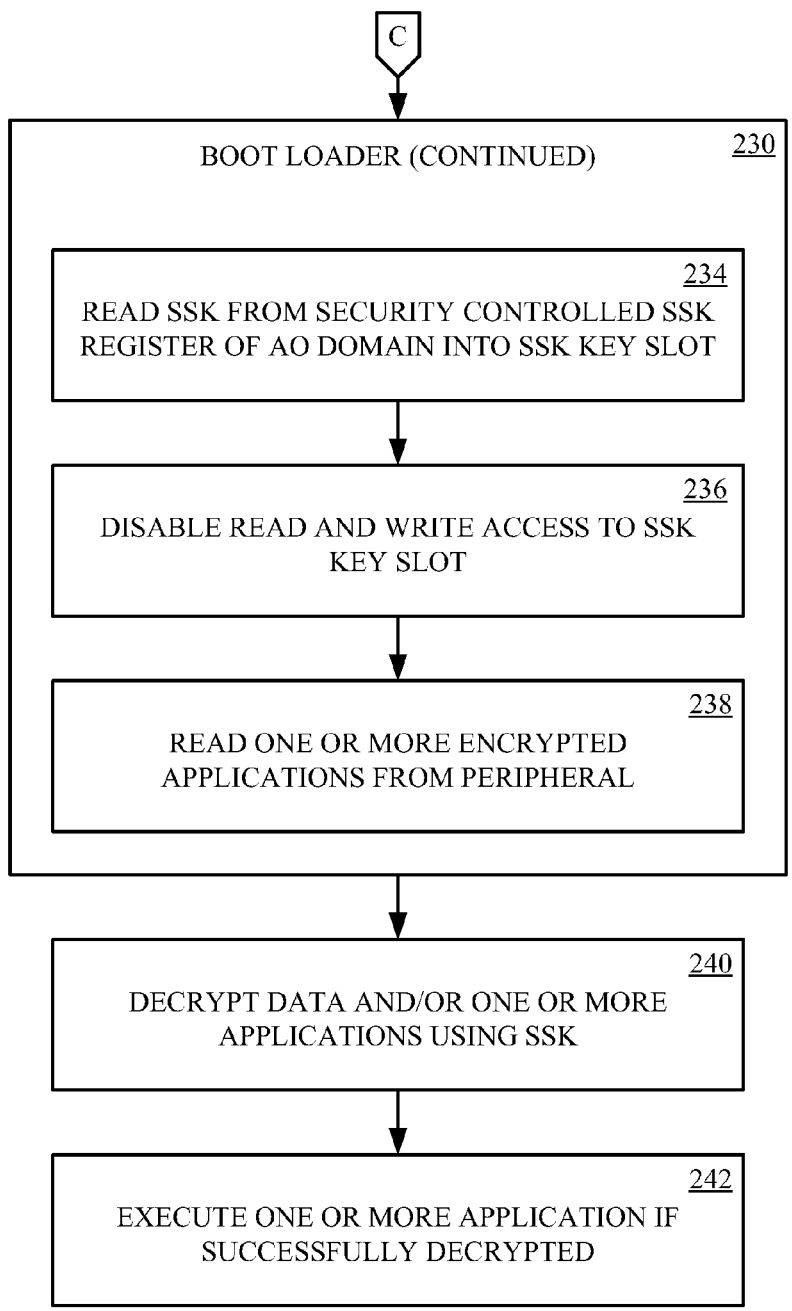
Figure 3A:
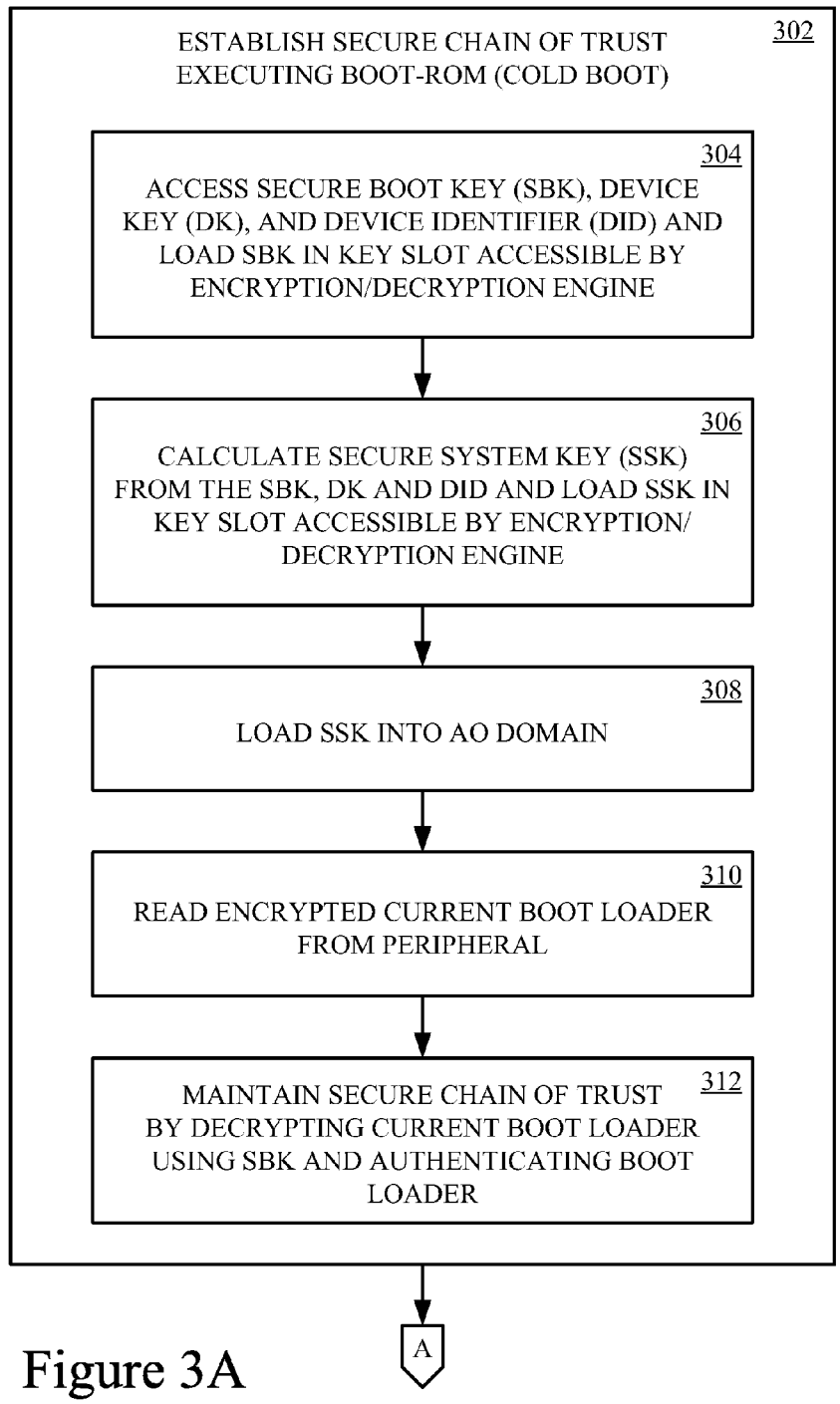
FIGS. 3A-3E show a flow diagram of a method of securely updating the boot code of the device without knowledge of a boot key, in accordance with one embodiment of the present technology.
Figure 3B:
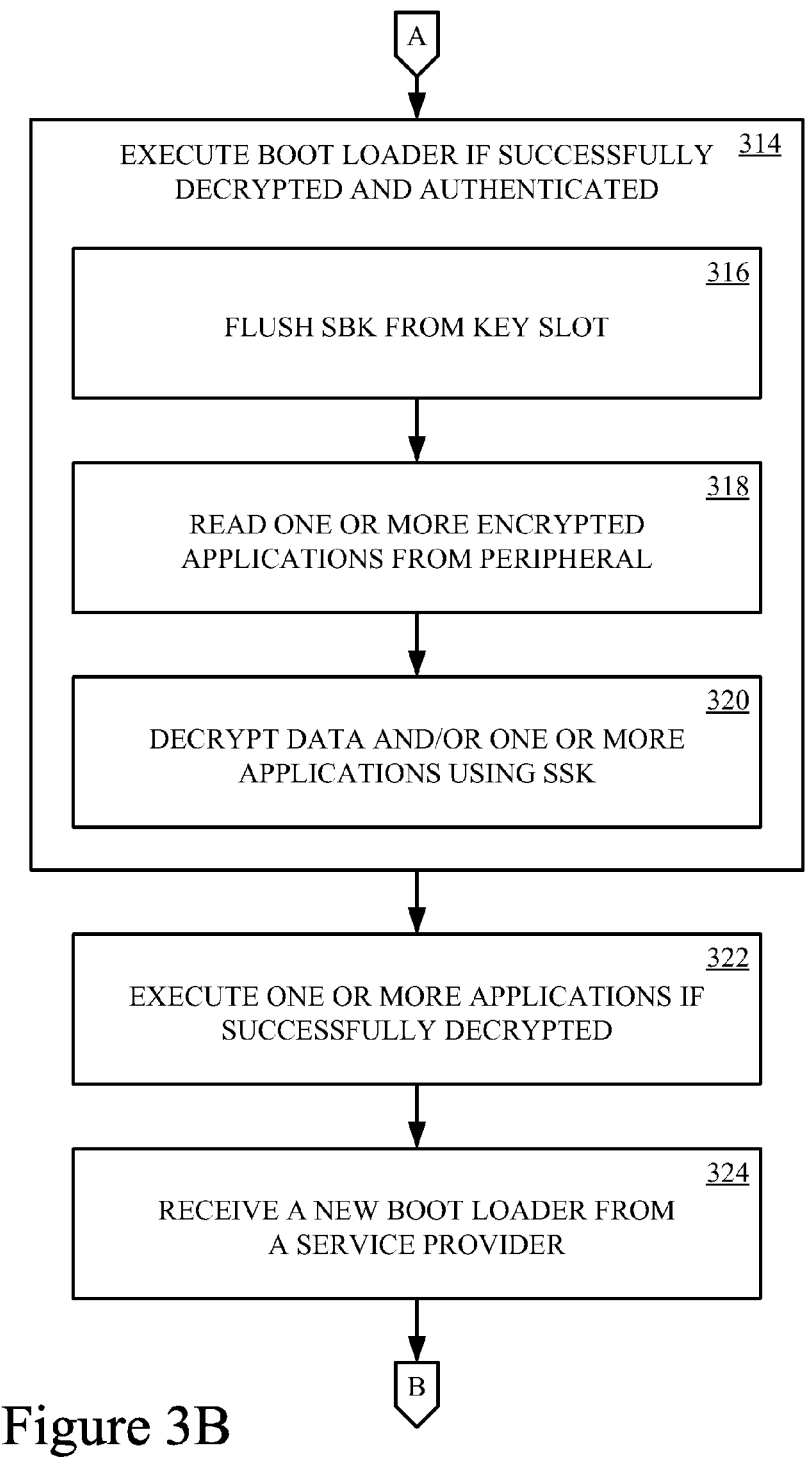
Figure 3C:
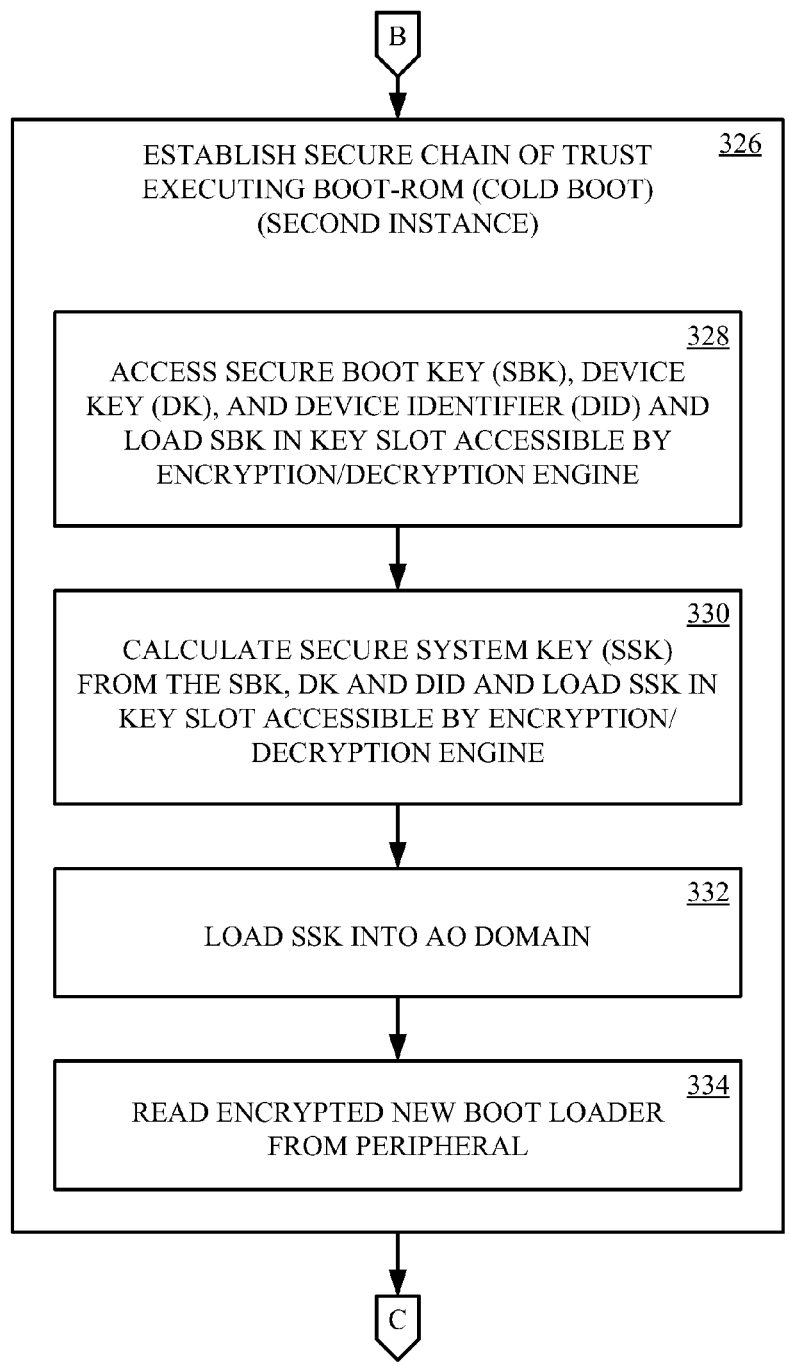
Figure 3D:
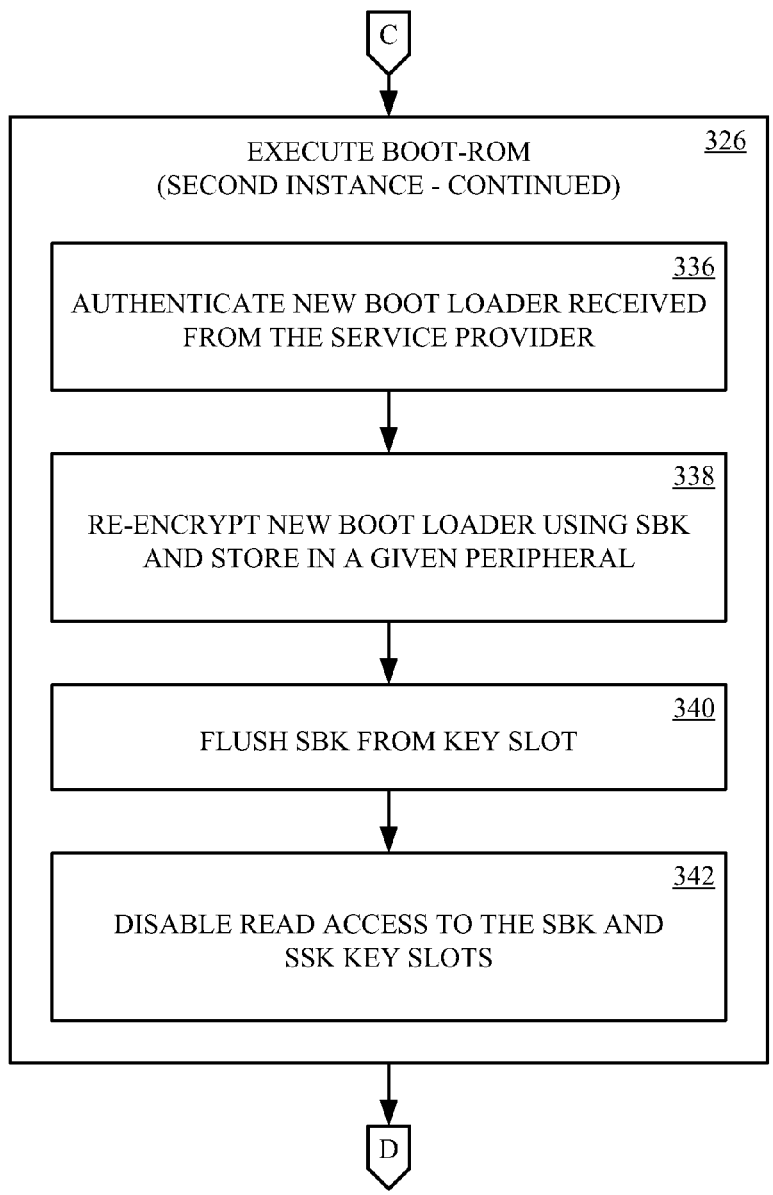
Figure 3E:
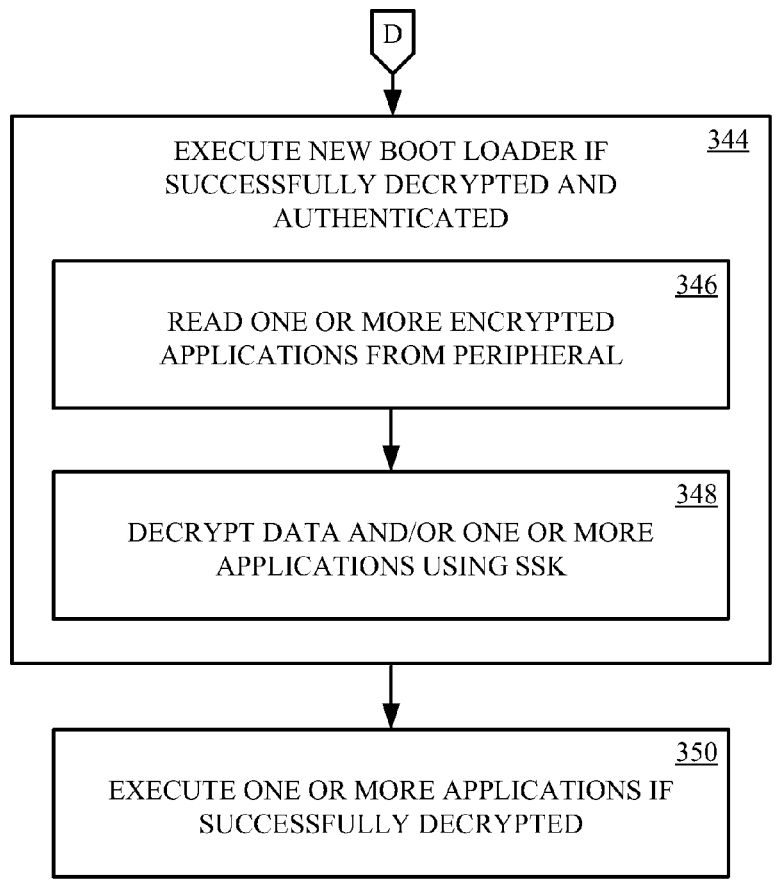

Referring to FIG. 1, an exemplary system for implementing embodiments of the present technology, is shown. The exemplary system 105 includes a device 110 and one or more peripherals 115-130. The peripherals 115-130 may be internal and/or external peripheral devices, such as keypad, cursor controller, communication port, computing device readable medium (CDRM) (e.g., hard disk driver (HDD) 125, random access memory (RAM) 130) and/or the like. The peripherals 115-130 may be coupled to the device 110 by one or more communication channels. The device 110 includes an always-on (AO) domain 135 and one or more controllable power domains 140, 145. The AO domain 135 always has power and if applicable clock signals applied to it when the device is turned on. The AO domain may include a real-time clock functional unit, a power management controller functional unit, a keyboard controller functional unit, and/or storage register functional unit. The controllable power domains 140, 145 may include one or more controllable supply potential domains 140 and/or one or more controllable clocked domains 145. The one or more controllable supply potential domains 140 may include one or more on-chip computing device readable media (CDRM) 150, one or more general processing units (e.g., CPU) 155, one or more specialized processing units (e.g., GPU) 160, one or more functional units (e.g., Advanced Encryption Standard (AES) engine) 165, and one or more system controllers 170-180. The one or more controllable clocked domains 145 may include one or more specialized processing units and/or functional units 185. Accordingly, the device 110 may be referred to as a system-on-a-chip (SoC) integrated circuit.

The on-chip CDRM 150 stores a first portion of boot code for configuring the device and loading other portions of the boot code, Operating System (OS), interrupt handlers and applications from one or more peripheral non-volatile CDRMs (e.g., HDD, flash media) 125 into one or more CDRMs (e.g., RAM) 130 accessible to the general and/or specialized processing units 155, 160. The general processing unit (e.g., CPU) 155 provides the computational hardware resource to execute general software-based functionality of the device 110. Such software functionality may include executing operating system (OS) software, interrupt handling software that helps the device respond to external events, application software, and the like. The specialized processors (e.g., GPU) provide computational hardware resources to execute specialized functionalities, such as a graphics processing unit (GPU) 160, digital signal processing, video encoder/decoder, and/or the like. The system controllers 170-180 provide various functionalities for communicating between functional element of the device 110 and with the peripherals 115-130.

The device 110 of the system 105 is adapted to handle storage keys during a plurality of power states of the device. The device 110 is also adapted to securely update the boot code of the device without knowledge of a boot key. In addition, the device 110 is also adapted to provide a secure recovery mode.

Referring now to FIGS. 2A-2D, a method of handling storage keys during a plurality of power states of the device, in accordance with one embodiment of the present technology, is shown. Initially, the device 110 of the system 105 executes a boot program to setup the device 110 to run one or more applications. The boot program typically includes one or more portions. The first portion of the boot program is stored in the on-chip ROM 150, and is referred to herein as boot-ROM code (BR). At 202, the BR is executed by the processing unit 155 to establish a chain of trust. During execution of the BR, a secure boot key (SBK), device key (DK) and Device Identifier (DID) are accessed and the SBK is loaded into a corresponding SBK key slot accessible by an encryption/decryption engine, at 204. The encryption/decryption egine supports read, write, encrypt and decrypt access to the keyslots. Persistent or "sticky" bits control read and write access to the keyslot, but do not prevent access for encryption/decryption operations. The SBK is used by the device manufacturer to protect and authenticate portions of the boot code stored off-chip (e.g., in a peripheral). In one implementation, the SBK is a secret key chosen by the device manufacturer and/or know/chosen by the system manufacturer. In one implementation, the SBK is programmed into an SBK register, such as on-chip fuses. Therefore, the SBK is modifiable but cannot be reset to a previous value. In one implementation, the SBK is readable only by protected code. In one implementation, the protected code is BR code. In one implementation, the SBK is a 128-bit key. In one implementation, the DK is a secret value known to the system manufacturer. In one implementation, the DK is programmed into a DK register, such as on-chip fuses. Therefore, the DK is also modifiable but cannot be rest to a previous value. In one implementation, the DK is readable only by protected code. In one implementation, the protected code is BR code. In one implementation, the DK is a 32-bit key. In one implementation, the DID is a device specific value programmed into on-chip fuses by the manufacturer and is publicly accessible. In one implementation, the DID is a 64-bit value.

At 206, a secure system key (SSK) is calculated from the SBK, DK, and DID and loaded into a corresponding SSK key slot accessible by the encryption/decryption engine. The Secure Storage Key (SSK) is used by the system manufacturer to protect customer-defined data. The SSK is computed from the device manufacturer-programmed Secure Boot Key (SBK), system manufacturer-programmed Device Key (DK) and device manufacturer-programmed unique Device Identifier (UID). The SSK may in one implementation be computed as follows:

$$SSK=AES(SBK;DID\hat{\ }AES(SBK;DK))$$

The device manufacturer-programmed DID is different for every chip. Accordingly, the SSK is also unique for each chip. In addition, the SBK may also be unique for each chip or common across multiple chips (e.g., a lot) as determined by the system manufacturer. The DK may also be unique for each chip or common across multiple chips.

At 208, the SSK is loaded into an SSK register in the AO domain 140 of the device 110. Flushing the SBK from the SBK key prevents other code not explicitly authenticated with the SBK from performing encryption/decryption operations with the SBK. At 210, an additional portion of the boot code, referred to as the Boot Loader (BL) is read from a given peripheral device specified for storing the BL. The BL stored on the peripheral is encrypted. At 212, the boot loader is decrypted using the SBK, thereby authenticating the boot loader. The boot loader may be further authenticated using a digest, digital certificate or the like based authentication technique. Decrypting and authenticating the boot loader using the SBK maintains the secure chain of trust.

The SSK register in the AO domain includes security controls that protect the register against reading and writing from outside the BL. In one implementation the security controlled SSK register includes persistent read and write bits. When the SSK is loaded into the SSK register by the BR at 208 a read sticky bit is set (disabling read access) but not the write sticky bit (allowing subsequent write access), at 214. In addition, the SBK and SSK key slots are protected by persistent read/write bits that are set by the BR to prevent access from outside the BR.

At 216, the BL is executed by the processing unit 155, if the BL is successfully decrypted and authenticated. During execution of the BL, data and/or one or more applications are read from one or more peripherals, at 218. In one implementation, the applications may be stored in encrypted form. At 220, any encrypted data or applications are decrypted using the SSK.

At 222, the device 110 may optionally allow the system manufacturer to change the SSK. If the SSK is changed by the system manufacturer, the new SSK is stored in the corresponding SSK key slot and the SSK is stored in the security controlled register in the AO domain, at 224. Because the write bit is not set at 214 when the SSK is first written to the SSK register in the AO domain, the SSK can be changed by the system manufacturer and can be restored when the encryption/decryption engine returns from a low power state. However, when the SSK in the SSK register of the AO domain is overwritten at 222, the persistent write bit may be set to prevent further overwrites. Write access to the key slot holding the SSK may also be disabled at this point by setting its persistent write bit and thereby preventing further overwrites. After the SSK is changed if applicable, the applications are executed, at 226. The applications may include the OS, interrupt routines, utilities and user applications such as music players, games, cell phone, GPS and the like.

At 228, one or more domains, one of which includes the encryption/decryption engine 165, may be cycled into a low power state. A restart occurs when the domain cycles out of the low power state, at 230. During execution of the BL in response to the re-start, code remaining in one or more peripherals (e.g., RAM) is validated and access to the security controlled SSK register in the AO domain is reset to allow read and write access, at 232. At 234, the SSK is read from the security controller SSK register of the AO domain into the SSK key slot. When the SSK is read from the SSK register into the corresponding key slot for the encryption/decryption engine by the BL, the read-disable and write-disable persistent bits are set, at 236. Thereafter, data and/or one or more applications are read from one or more peripherals, at 238. In one implementation, the applications may be stored in encrypted form. At 240, any encrypted data or applications are decrypted using the SSK. At 242, the applications are executed.

Accordingly, embodiments of the present technology advantageously maintain the system storage key (SSK) in the AO domain and restore the SSK to the encryption/decryption engine when the engine is turned back on. The SSK however is only accessible by the BL, which provides a secure chain of trust. In addition, embodiments optionally allow the SSK to be updated.

Referring now to FIGS. 3A-3E, a method of securely update the boot code of the device without knowledge of a boot key, in accordance with one embodiment of the present technology, is shown. Again, the BR is executed (e.g., cold boot) by the processing unit 150 to established a chain of trust, at 302. During execution of the BR, a secure boot key (SBK), device key (DK) and Device Identifier (DID) are accessed and the SBK is loaded into a corresponding SBK key slot accessible by an encryption/decryption engine, at 304. The SBK register is protected by persistent read/write bits that are set by the BR after accessing the SBK to prevent access from outside the BR. At 306, a secure system key (SSK) is calculated from the SBK, DK, and DID and loaded into a corresponding SSK key slot, as described above in more detail.

At 308, the SSK is loaded into an SSK register in the AO domain 140 of the device 110. At 310, an additional portion of the boot code, referred to as the Boot Loader (BL) is read from a given peripheral device specified for storing the BL. The BL stored on the peripheral is encrypted. At 312, the boot loader is decrypted using the SBK, thereby authenticating the boot loader. The boot loader may be further authenticated using a digest, digital certificate or the like based authentication technique. Decrypting and authenticating the boot loader using the SBK maintains the secure chain of trust.

At 314, the BL is executed by the processing unit 150, if the BL is successfully decrypted and authenticated. During execution of the BL, the SBK is flushed from the key slot, at 316. The SBK may be flushed by overwriting with all zeroes or some other pattern. Thereafter, one or more applications are read from one or more peripherals, at 318. In one implementation, the applications may be stored in encrypted form. At 320, any encrypted applications are decrypted using the SSK. At 322, the applications are executed. The applications may include the OS, interrupt routines, utilities and user applications such as music players, games, cell phone, GPS and the like.

At 324, a new boot loader is received from a service provider. The new boot loader may be encoded using public key encryption or the like. At some point thereafter, the device is re-started (e.g., cold boot). At 326, the BR is executed in response to a re-start. During execution of the BR, a secure boot key (SBK), device key (DK) and Device Identifier (DID) are accessed and the SBK is loaded into a corresponding SBK key slot accessible by an encryption/decryption engine, at 328. The SBK register is protected by persistent read/write bits that are set by the BR after accessing the SBK to prevent access from outside the BR. At 330, a secure system key (SSK) is calculated from the SBK, DK, and DID and loaded into a corresponding SSK key slot, as described above in more detail. At 332, the SSK is loaded into an SSK register in the AO domain 140 of the device 110. The new boot loader is then read from the peripheral, at 334. The new boot loader will typically be stored in an encrypted format. At 336, the new boot loader received from the service provider is authenticated. At 338, the new boot loader is encrypted using the SBK and stored in the given peripheral specified for storing the BL. At 340, the SBK is flushed from the key slot. The read sticky bit for the SSK is set (disabling read access) but not the write sticky bit (allowing subsequent write access), at 342. In addition, the SBK and SSK key slots are protected by persistent read/write bits that are set by the BR to prevent access from outside the BR.

At 344, the new BL is executed by the processing unit 155, if the new BL is successfully decrypted and authenticated. At 346, data and/or one or more applications are read from one or more peripherals during execution of the new BL. In one implementation, the applications may be stored in an encrypted form. At 348, any encrypted data or applications are decrypted using the SSK. At 350, the applications are executed. The applications may include the OS, interrupt routines, utilities and user applications such as music players, games, cell phone, GPS and the like.

The next time the device is cold-booted the new BL will be loaded and executed. Accordingly, embodiments of the present technology also advantageously enable the secure updating of the boot loader code without knowing the secure boot key.

Figure 4A:
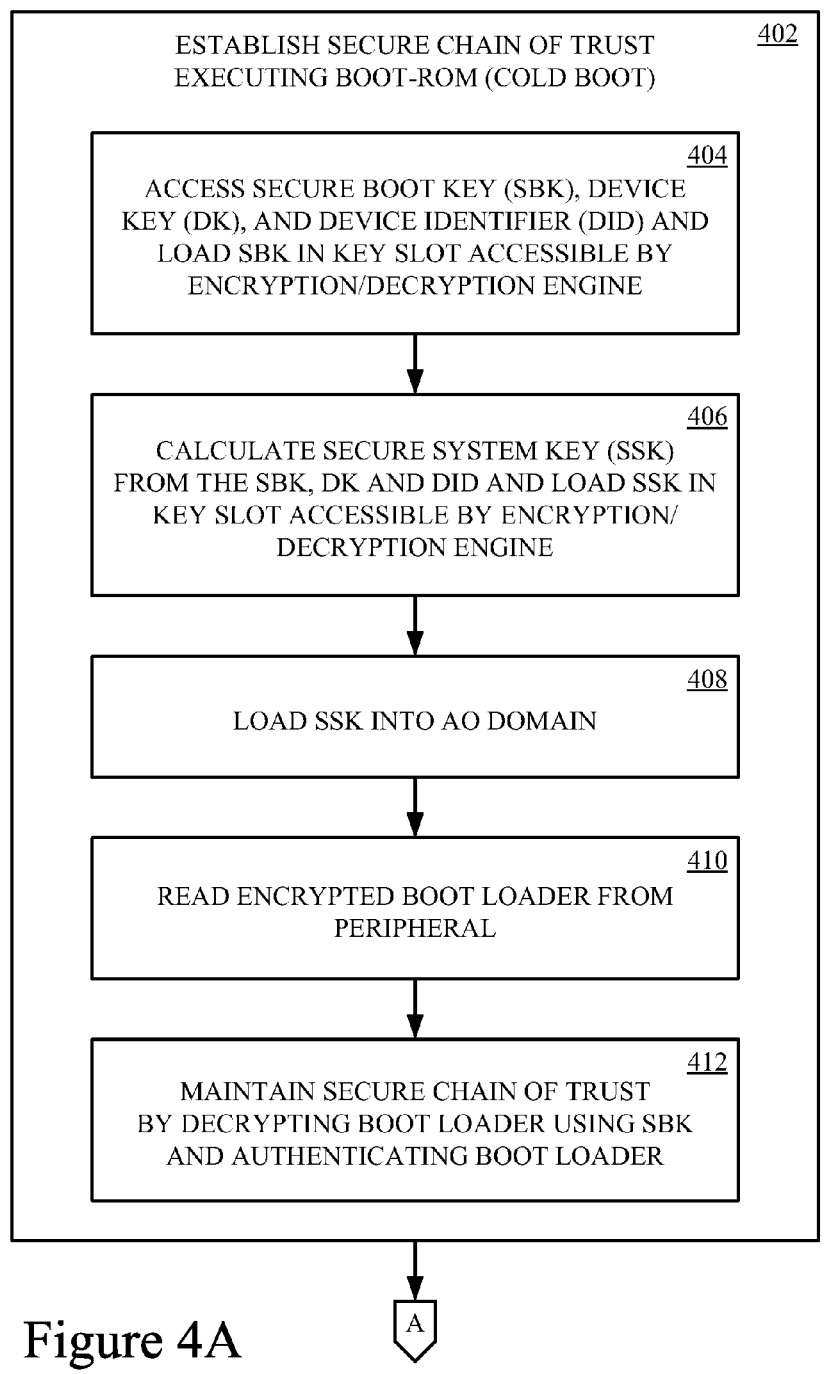
FIGS. 4A-4B show a flow diagram of a method of securely updating the boot code of the device without knowledge of a boot key, in accordance with one embodiment of the present technology.
Figure 4B:
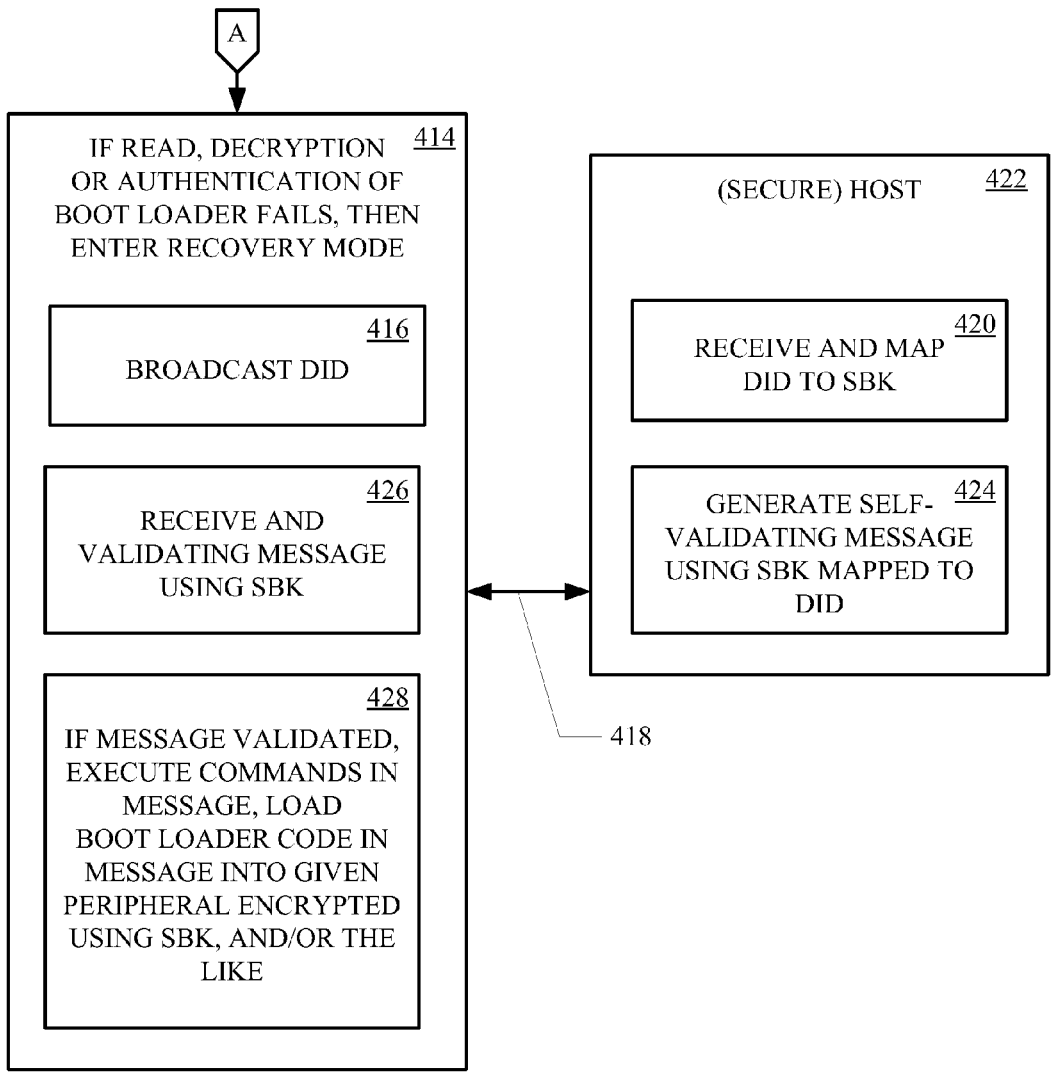

Referring now to FIGS. 4A-4B, a secure method of recovery, in accordance with one embodiment of the present technology, is shown. Again, the BR is executed (e.g., cold boot) by the processing unit 155 to established a chain of trust, at 402. During execution of the BR, a secure boot key (SBK), device key (DK) and Device Identifier (DID) are accessed and the SBK is loaded into a corresponding SBK key slot accessible by an encryption/decryption engine, at 404. At 406, a secure system key (SSK) is calculated from the SBK, DK, and DID and loaded into a corresponding SSK key slot, as described above in more detail.

At 408, the SSK is loaded into an SSK register in the AO domain 135 of the device 110. At 410, the BL is read from the given peripheral device specified for storing the BL. The BL stored on the peripheral is encrypted. At 412, the boot loader is decrypted using the SBK, thereby authenticating the boot loader. The boot loader may be further authenticated using a digest, digital certificate or the like based authentication technique.

Figure 5A:
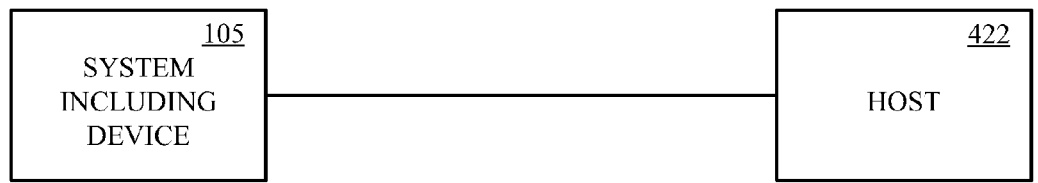
FIGS. 5A-5B shows a block diagram of an example recovery mode system, in accordance with embodiments of the present technology.
Figure 5B:
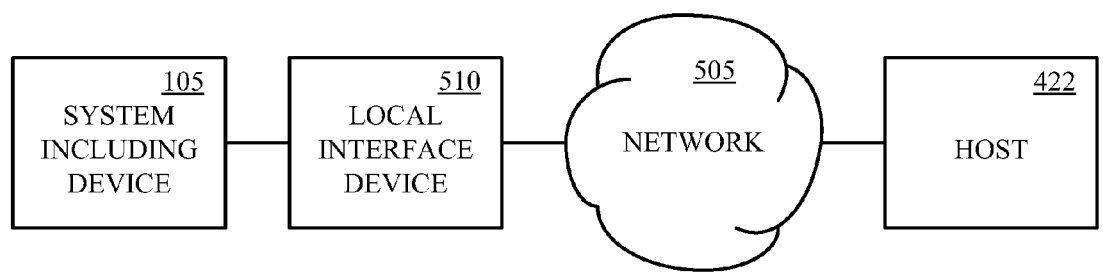
Figure 6:
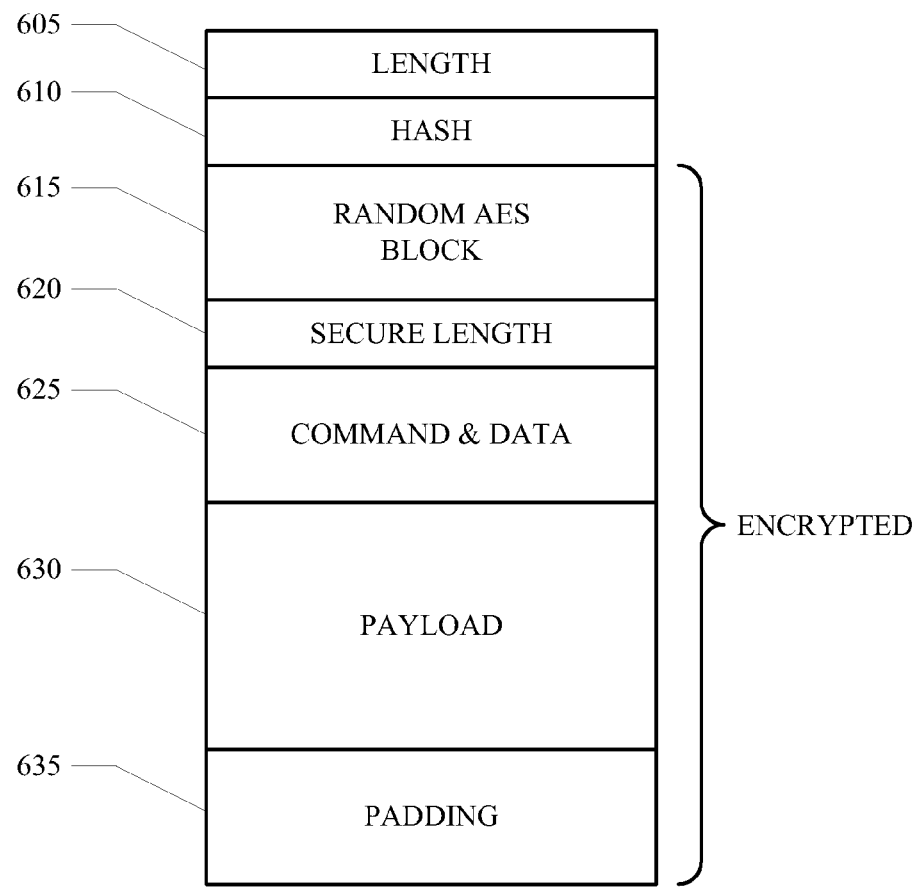
FIG. 6 shows a block diagram of an exemplary recovery mode self-validating message, in accordance with one embodiment of the present technology.

If the BL is successfully decrypted and authenticated, the BL is executed by the processing unit 155. However, if the read and/or the decryption/authentication processes of 410, 412 fail, the device enters a recover mode at 414. The device is considered locked or a brick when it fails to read and/or decrypt and authenticate the BL. In addition, when the device is still in the manufacturing stage, the recovery mode may be used to load the SBK, DK and/or BL onto the system for the first time. During recovery mode, the device 110 broadcasts the DID of the device 110 on a given communication channel. In one implementation, the communication channel is a Universal Serial Bus (USB) link 418. The system containing the device 105 may be coupled to a host 422 directly or through a network 505 and a local interface device 510 as illustrated in FIGS. 5A and 5B. At 420, a host 422 device receives and maps the DID to a given SBK. The host 422 then generates a self-validating message using the given SBK and transmits the self-validating message to the device 110, at 424. In exemplary implementation, the message includes a (unsecure) length 605, a hash 610, a random AES block 615, a secure length 620, command and data 625, a payload 630 and padding (e.g., 0X80 followed by additional 0X00 bytes as needed) 635, as illustrated in FIG. 6. The random AES block 615, secure length 620, commands and data 625, payload 630 and padding 635 are encoded using the SBK mapped to the DID. At 426, the message is received and validated by the device 110 using the SBK of the device. In one implementation, the received message is valid if the unsecure length 605 matches the secure length 620, the hash 610 is correct, the command 615 is valid (e.g., valid command types for the given message), if the size of the message is correct (as specified by the Command and Data), if the size of the payload is correct, if the padding pattern is correct, and/or if the BR version number in the command and data 625 matches the BR version on the device 110. If the message is validated, the device 110 loads the message into a peripheral (e.g., RAM) and executes it, at 428. The recovery mode may execute one or more commands in the message, execute code contained in the message and/or stores BL code in the message into a given peripheral, at 428. If BL code is received in the message, the BL is stored in the given peripheral encoded using the SBK. Optionally, the device 110 can download and authenticate additional data from the host. The additional data may be encrypted and signed, using the SBK, before writing it to the peripheral. In this way, the recovery mode can provide for multiple message transmission and response sequences. If the message does not validate, the device 110 may enter an infinite loop requiring a system reset to proceed.

Accordingly, embodiments of the present technology also advantageously enable secure downloading of BL code to a locked system.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the Claims appended hereto and their equivalents.

What is claimed is:

1. A method of securely updating a boot image:
    receiving, by a device, a new boot loader portion of a boot code from a service provider;
    loading, by the device, the received new boot loader portion of the boot code into a given peripheral of the device;
    executing, by the device, a reset after loading the received new boot loader portion of the boot code into the given peripheral; and
    executing, by a processing unit of the device in response to executing the reset, a first portion of the boot code stored on an integrated circuit chip of the processing unit to;
        start a secure chain of trust from executing by the processing unit the first portion of the boot code stored in read only memory on the integrated circuit chip of the processing unit;
        obtain a secure boot key, during execution of the first portion of the boot code, from a secure boot register which is protected by persistent read/write bits that are set by the first portion of the boot code after obtaining the secure boot key to prevent access from outside the first portion of the boot code;
        access a device key and a device identifier while executing the first portion of the boot code;
        calculate a secure system key from the secure boot key, device key and device identifier while executing the first portion of the boot code and storing the secure system key and secure boot key in respective keyslots of an encryption/decryption engine and the secure system key in a secure system key register in an always-on domain;
        authenticate the new boot loader portion of the boot code from the given peripheral device during execution of the first portion of the boot code;
        store the authenticated new boot loader portion of the boot code encrypted by the encryption/decryption engine, using the secure boot key in the secure boot key keyslot of the encryption/decryption engine, in a specified peripheral device during execution of the first portion of the boot code; and
        flush the secure boot key from the secure boot key keyslot of the encryption/decryption engine after encrypting the authenticated new boot loader during execution of the first portion of the boot code.

2. The method according to claim 1, wherein executing a first portion of boot code stored on the chip for starting a secure chain of trust comprises executing a secure boot ROM code portion of the boot code stored on the chip.

3. The method according to claim 2, wherein obtaining the secure boot key comprises accessing the secure boot key during execution of the secure boot ROM code, wherein the secure boot key is stored in a set of fuses that are protected against access by non-boot ROM code.

4. The method according to claim 3, wherein authenticating the new boot loader portion of the boot code comprises decrypting the new boot loader by the encryption/decryption engine, using the secure boot key in the secure boot key keyslot of the encryption/decryption engine, from the given peripheral device.

5. The method according to claim 4, further comprising executing the new boot loader if the new boot loader is successfully decrypted and authenticated.

6. The method according to claim 5, further comprising:
    reading at encrypted application from a peripheral and decrypting the application by the encryption/decryption engine, using the secure system key in the secure system key keyslot of the encryption/decryption engine, while executing the new boot loader portion of the boot code; and
    executing the application if the application is successfully decrypted.

7. The method according to claim 1, wherein the system boot key is a secret key chosen by a device or system manufacturer of a device performing the method of securely updating the boot image.

8. The method according to claim 7, wherein the device key is a secret key known to the system manufacturer of the device performing the method of securely updating the boot image.

9. The method according to claim 8, wherein the device identifier is a device specific value of the device performing the method of securely updating the boot image.

10. One or more non-transitory computing device readable medium storing one or more computing device executable instructions which when executed by a device perform a process comprising:
    receiving, by a device, a new boot loader portion of a boot code;

loading, by the device, the received new boot loader into a given peripheral device, executing, by a processing unit of the device, a reset after loading the new boot loader into the given peripheral of the device;

executing, by the processing unit in response to executing the reset, a first portion of the boot code stored on the processing unit for;

starting a secure chain of trust from executing by the processing unit the first portion of the boot code stored in read only memory on the processing unit;

accessing a first secret key from a first register which is protected by persistent read/write bits that are set by the first portion of the boot code after accessing the first secret key to prevent access from outside of the first portion of the boot code, wherein the first secret key is chosen by a device or system manufacturer of the device;

accessing a second secret key and a device identifier;

calculating a third key from the first secret key, second secret key and device identifier while executing a the first portion of boot code stored on a chip for starting a secure chain of trust;

storing the first secret key in a first keyslot and the third key in a second keyslot of an encryption/decryption engine, wherein the first keyslot and second keyslot are not accessible outside the encryption/decryption engine;

storing the third key in a secure key register in an always-on domain;

authenticating the new boot loader;

storing the authenticated new boot loader encrypted by the encryption/decryption engine, using the first secret key in the first keyslot, in a specified peripheral device if the new boot loader is authenticated; and flushing the first secret key from the first keyslot of the encryption/decryption engine after encrypting the authenticated new boot loader.

11. The one or more non-transitory computing device readable medium storing one or more computing device executable instructions which when executed by the device perform the process of claim 10, wherein executing a first portion of boot code comprises executing a boot ROM code portion.

12. The one or more non-transitory computing device readable medium storing one or more computing device executable instructions which when executed by the device perform the process of claim 11, wherein accessing a first secret key comprises reading the first secret key from a register readable by protected code.

13. The one or more non-transitory computing device readable medium storing one or more computing device executable instructions which when executed by the device perform the process of claim 12, wherein authenticating the new boot loader comprises decrypting the new boot loader.

14. The one or more non-transitory computing device readable medium storing one or more computing device executable instructions which when executed by the device perform the process of claim 13, further comprising executing the new boot loader if the new boot loader is successfully decrypted and authenticated.

15. The one or more non-transitory computing device readable medium storing one or more computing device executable instructions which when executed by the device perform the process of claim 14, further comprising:

reading an encrypted application from a peripheral;

decrypting the application using the third secret key while executing the new boot loader; and executing the application if the application is successfully decrypted.

16. The one or more non-transitory computing device readable medium storing one or more computing device executable instructions which when executed by the device perform the process of claim 15, wherein the first secret key is known by a device or system manufacturer of the device.

17. The one or more non-transitory computing device readable medium storing one or more computing device executable instructions which when executed by the device perform the process of claim 16, wherein the second secret key is known to the system manufacturer of the device.

18. The one or more non-transitory computing device readable medium storing one or more computing device executable instructions which when executed by the device perform the process of claim 16, wherein the device identifier is specific to the device.

* * * * *